United States Patent [19]

Morris et al.

[11] Patent Number: 4,459,402

[45] Date of Patent: Jul. 10, 1984

[54] COPOLYESTERS COMPRISING REPEATING UNITS FROM TRANS-4,4'-STILBENEDICARBOXYLIC ACID, TEREPHTHALIC ACID AND/OR 2,6-NAPHTHALENEDICARBOXYLIC ACID, AND 1,4-BUTANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 475,565

[22] Filed: Mar. 15, 1983

[51] Int. Cl.$^3$ .................. C08G 63/18; C08G 63/54
[52] U.S. Cl. .................. 528/298; 528/299; 528/302; 528/303; 528/304; 528/305; 528/306
[58] Field of Search ............... 528/298, 299, 302–306

[56] References Cited

U.S. PATENT DOCUMENTS

| | | | |
|---|---|---|---|
| 2,657,194 | 10/1953 | Butler et al. | 528/306 |
| 2,657,195 | 10/1953 | Toland | 528/306 |
| 3,190,764 | 6/1965 | Cardina | 427/407.1 |
| 3,247,043 | 4/1966 | Cardina | 427/400 |
| 3,496,839 | 2/1970 | Hartle | 528/306 |
| 3,842,040 | 10/1974 | Browne et al. | 528/176 |
| 3,842,041 | 10/1974 | Browne et al. | 528/176 |

Primary Examiner—Lester L. Lee
Attorney, Agent, or Firm—William P. Heath, Jr.; Daniel B. Reece, III

[57] ABSTRACT

The polyesters of trans-4,4'-stilbenedicarboxylic acid and 1,4-butanediol modified with 20 to 80 mol % terephthalic acid and/or 20 to 80 mol % of 2,6-naphthalenedicarboxylic acid can be injection-molded to give plastics, extruded into films or spun into fibers to give shaped objects with high strength.

5 Claims, No Drawings

COPOLYESTERS COMPRISING REPEATING UNITS FROM TRANS-4,4'-STILBENEDICARBOXYLIC ACID, TEREPHTHALIC ACID AND/OR 2,6-NAPHTHALENEDICARBOXYLIC ACID, AND 1,4-BUTANEDIOL

This invention relates to polyesters of high molecular weight useful as films, fibers, and molding plastics. It is particularly concerned with the preparation of polyesters comprising repeating units from 20–80 mol % trans-4,4'-stilbenedicarboxylic acid, 80–20 mol % terephthalic acid and/or 80–20 mol % 2,6-naphthalenedicarboxylic acid, and 100 mol % 1,4-butanediol.

This invention provides molding plastics with superior strength to those of conventional polyesters prepared from symmetrical aromatic acids and aliphatic glycols. This invention provides films with high tensile strength and fibers with high as-spun tenacities.

PRIOR ART

Japanese Kokai No. 72348/74 discloses the polymer of 100 mol % trans-4,4'-stilbenedicarboxylic acid and 1,6-hexanediol blended with poly(1,4-butylene terephthalate).

U.S. Pat. No. 2,657,195 discloses polyesters, polyamides, and polyesteramides prepared from various isomeric stilbenedicarboxylic acids and glycols containing from 2 to 16 carbons. In a general listing of glycols useful for the invention, 1,4-butanediol is disclosed but no examples are given (Column 3, line 41). Example 1 and Example 5 are homopolyesters of ethylene glycol and 1,5-pentanediol, respectively. The remaining examples deal with polyesters prepared from terephthalic acid and stilbenedicarboxylic acid and ethylene glycol.

U.S. Pat. No. 3,496,839 discloses low molecular weight homopolyesters of 4,4'-stilbenedicarboxylic acid and glycols containing 2 to 20 carbon atoms, but no 1,4-butanediol examples are given. All the examples concern low molecular weight polyesters of 4,4'-stilbenedicarboxylic acid, neopentyl glycol, and terephthalic acid. It is also important to note that none of the isomers of stilbenedicarboxylic acid are distinguished from one another in either patent.

Stilbenedicarboxylic acid polyesters containing sulfonate groups are disclosed in U.S. Pat. No. 4,073,777. Example 6 illustrates a low molecular weight polyester containing 10 wt. % 4,4'-stilbenedicarboxylic acid which is useful for radiation crosslinkable water dispersible coatings. Also, in a general listing of glycols useful for the invention (Column 3, line 27), 1,4-butanediol is mentioned but no examples are given.

In U.S. Pat. No. 3,190,764, Column 3, line 27 and in U.S. Pat. No. 3,247,043, Column 3, line 32, polyesters of stilbenedicarboxylic acid are disclosed, but no 1,4-butanediol examples are given.

Other U.S. patents which disclose stilbenedicarboxylic acid polyesters are U.S. Pat. No. 2,657,194, U.S. Pat. No. 3,842,040, and U.S. Pat. No. 3,842,041. No 1,4-butanediol polymer examples are given. Polyesters of trans-4,4'-stilbenedicarboxylic acid and neopentyl glycol, 1,5-pentanediol, 1,6-hexanediol, and 1,10-decanediol are disclosed by Meurisse et al in the *British Polymer Journal*, Vol. 13, 1981, page 57 (Table 1).

PRACTICE OF THE INVENTION

The prior art discloses molding, spinning, and extruding into film as viable processes for shaping the polymers based on stilbenedicarboxylic acid. We have discovered a range of polymer compositions based on 1,4-butanediol and the trans-4,4'-stilbenedicarboxylic acid (SDA) isomer within this broad disclosure which exhibit exceptionally high tensile strength when molded, extruded, or spun. Injection molded polymers containing repeating units from about 20 to 80 mol % trans-4,4'-stilbenedicarboxylic acid, 20 to 80 mol % 2,6-naphthalenedicarboxylic acid and/or 30 to 80 mol % terephthalic acid, and 100 mol % 1,4-butanediol exhibit a tensile strength >20,000 psi and as-spun fibers exhibit tenacities >7.0 g./den.

The polyesters of this invention are prepared from trans-4,4'-stilbenedicarboxylic acid and/or its esters, terephthalic acid and/or 2,6-naphthalenedicarboxylic acid or their esters, and 1,4-butanediol. Examples of useful acid esters are the dimethyl, diethyl, dipropyl, dibutyl, diphenyl, or any combination of these mixed esters.

The terephthalic acid portion of the polymer may vary from 20 to 80 mol %, preferably 30 to 80 mol %, such that the total dicarboxylic acid content of the polymers is 100 mol %. The 2,6-naphthalenedicarboxylic acid portion of the polymer may vary from 20 to 80 mol %. The terephthalic acid or 2,6-naphthalenedicarboxylic acid portion of the polymer may be replaced with up to 10 mol % of isophthalic acid. The terephthalic acid portion may also be replaced with a substituted terephthalic acid such as 2-chloro, 2-methyl, 2-ethyl, 2-propyl, 2,5-dichloro-, or 2,5-dimethyl terephthalic acid. Terephthalic acid or 2,6-naphthalenedicarboxylic acid is preferred.

The trans-4,4'-stilbenedicarboxylic acid content of the polymer varies from 20 to 80 mol % such that the sum of the total dicarboxylic acid content of the polymer is 100 mol %. The inherent viscosities of the polymers are at least 0.3 and preferably at least 0.4. The polymers are prepared in the melt or by solid-phase polymerization of ground polymer or by a combination of these processes.

The following examples illustrate the unobviously high strength and stiffness of these copolymers.

This invention can be further illustrated by the following examples of preferred embodiments thereof, although it will be understood that these examples are included merely for purposes of illustration and are not intended to limit the scope of the invention unless otherwise specifically indicated.

EXAMPLES

All inherent viscosities are determined at 25° C. in 60/40 (wt./wt.) phenol/tetrachloroethane (PTCE) at a concentration of 0.5 g./100 mL.

The polyesters are dried at 80°–100° C. for 24 hours in a vacuum oven and injection-molded on a one-ounce Watson-Stillman molding machine to give 2½×⅜×1/16 inch tensile bars and 5 ×½×⅛ inch flexure bars. An ASTM procedure is used for measuring the tensile strength (ASTM D-1708).

Fibers are spun on an Instron Melt Rheometer Model 3211 through a capillary (0.014 inch in diameter) equipped with a capillary heater. The design of the capillary allows use of a filtering system such as a wire screen and sand or stainless steel powder. Tensile properties of the fibers are determined using a standard one-inch gauge length for single filaments. Fibers are glued to a paper substrate prior to tensile testing to reduce damage to the single filaments from the clamps.

1. The following example illustrates the preparation of a polymer containing 70 mol % 2,6-naphthalenedicarboxylic acid, 30 mol % trans-4,4'-stilbenedicarboxylic acid, and 100 mol % 1,4-butanediol.

A mixture of 153.7 g. (0.63 mol) dimethyl 2,6-naphthalenedicarboxylate, 79.9 g. (0.27 mol) dimethyl trans-4,4'-stilbenedicarboxylate, 243.0 g. (2.7 mols) 1,4-butanediol, and 0.15 g. titanium tetraisopropoxide (100 ppm Ti) is placed in a one-liter flask equipped with an inlet for nitrogen, a metal stirrer, and a short distillation column. The flask is heated by a Wood's metal bath at 190° C. for one hour, at 220° C. for 1 hour, at 260° C. for ½ hour, and then a vacuum of 0.5 mm. is gradually applied over the next 10 minutes. After about ½ to 1 hour at 260° C., an off-white, high melt viscosity crystalline polymer is obtained with an I.V. of 0.96.

The polymer is ground to pass a 3 mm. screen, dried at 100° C., and injection molded at 260° C. to give molded bars wth 37,800 psi tensile strength.

2. A polymer having the same composition as Example 1 is prepared to an I.V. of 0.79. The polymer is spun on the Instron Melt Rheometer with the barrel at 260° C. and the capillary at 260° C. Fiber is extruded at 0.2 cm./min. and wound at 2500 ft./min. to give 1.6 denier as-spun fibers with 7.2 g./den. tenacity.

3. The polymer of Example 2 is solid phase polymerized by heating ground polymer ½ hour at 110° C., ¼ hour at 180° C., and 5½ hours at 210° C. to give polymer with an I.V. of 1.42.

This polymer is dried and spun as in Example 2 with the barrel at 260° C. and the capillary at 293° C. Fiber is extruded at 0.2 cm./min. and wound at 1500 ft./min. to give 3.4 denier as-spun fibers with 9.3 g./den. tenacity.

4. The following example illustrates the preparation of a polymer containing 50 mol % 2,6-naphthalenedicarboxylic acid, 50 mol % trans-4,4'-stilbenedicarboxylic acid, and 100 mol % 1,4-butanediol.

A mixture of 97.6 g. (0.4 mol) dimethyl 2,6-naphthalenedicarboxylate, 118.4 g. (0.4 mol) dimethyl trans-4,4'-stilbenedicarboxylate, 144.0 g. (1.6 mols) 1,4-butanediol, and 0.15 g. titanium tetraisopropoxide is placed in a one-liter flask equipped with an inlet for nitrogen, a metal stirrer, and a short distillation column. The flask is heated in a Wood's metal bath at 190° C. for 2 hours and at 260° C. for ½ hour. A vacuum of 0.5 mm. is applied gradually over the next 5 minutes. The melt turns opaque and after about 1¼ hours at 260° C., a high melt viscosity, opaque polymer is obtained with an I.V. of 1.03.

The polymer is treated as in Example 1 and injection molded at 260° C. to give molded bars with 33,100 psi tensile strength.

5. A polymer having the same composition as Example 4 is prepared in a similar manner to an I.V. of 0.98. The polymer is dried and spun as in Example 4 with the barrel at 260° C. and the capillary at 295° C. Fiber is extruded at 0.6 cm./min. and wound at 2600 ft./min. to give 4.1 denier as-spun fibers with 8.3 g./den. tenacity.

6. A polymer containing 50 mol % terephthalic acid, 50 mol % trans-4,4'-stilbenedicarboxylic acid, and 100 mol % 1,4-butanediol is prepared according to the procedures of Example 1 to an I.V. of 0.92.

The polymer is ground, dried, and injection molded at 260° C. to give molded bars with 37,100 psi tensile strength.

7. A polymer containing 20 mol % 2,6-naphthalenedicarboxylic acid, 80 mol % trans-4,4'-stilbenedicarboxylic acid, and 100 mol % 1,4-butanediol is prepared according to the procedure of Example 1. The final polycondensation is carried out at 280° C. to give a fibrous opaque polymer with an I.V. of 1.00.

The polymer is ground, dried, and injection molded at 280° C. to give molded bars with 38,200 psi tensile strength.

8. A polymer having the same composition as Example 7 is prepared to an I.V. of 1.07.

The polymer is dried and spun as in Example 2 with the barrel at 280° C. and the capillary at 325° C. Fiber is extruded at 0.2 cm./min. and wound at 3000 ft./min. to give 1.6 denier as-spun fibers with 8.4 g./den. tenacity.

9. A polymer containing 80 mol % 2,6-naphthalenedicarboxylic acid, 20 mol % trans-4,4'-stilbenedicarboxylic acid, and 100 mol % 1,4-butanediol is prepared according to the procedure of Example 1. The polymer has an I.V. of 1.00.

The polymer is dried and spun as in Example 2 with the barrel at 260° C. and the capillary at 282° C. Fiber was extruded at 0.2 cm./min. and wound at 2400 ft./min. to give 1.8 denier as-spun fibers with 10.4 g./den. tenacity.

The remaining 1,4-butanediol polymers and the following comparative examples containing 1,4-butanediol, 2,2-dimethyl-1,3-propanediol, 1,5-pentanediol, 1,6-hexanediol, and 1,4-cyclohexanedimethanol are prepared using the procedures of Examples 1–9.

10. A polymer containing 100 mol % 2,6-naphthalenedicarboxylic acid and 100 mol % 1,4-butanediol is prepared according to the procedures of Example 1 to an I.V. of 1.19.

The polymer is spun as in Example 2 with the barrel at 265° C. and the capillary at 310° C. Fiber is extruded at 0.2 cm./min. and wound at 3000 ft./min. to give 1.6 denier as-spun fibers with 4.5 g./den. tenacity.

11. A polymer having the same composition as Example 10 is prepared according to the procedure of Example 1 to an I.V. of 0.88.

The polymer is ground, dried, and injection molded to give bars with 13,900 psi tensile strength.

12. U.S. Pat. No. 3,496,839 discloses polymers of 4,4'-stilbenedicarboxylic acid and 1,3-propanediol (Column 2, line 29). For comparison with the polymer of our invention, we prepared a polymer of 90 mol % trans-4,4'-stilbenedicarboxylic acid, 10 mol % terephthalic acid, and 100 mol % 1,3-propanediol using a procedure similar to Example 1 to an I.V. of 0.81.

The polymer is dried, ground, and molded at 290° C. to give molded bars with 6000 psi tensile strength.

13. The polymer of 80 mol % trans-4,4'-stilbenedicarboxylic acid, 20 mol % terephthalic acid, and 100 mol % 1,3-propanediol is prepared as in Example 1 to an I.V. of 0.91.

The polymer is dried, ground, and molded at 280° C. to give molded bars with 12,100 psi tensile strength.

14. The polymer of 60 mol % terephthalic acid, 40 mol % trans-4,4'-stilbenedicarboxylic acid, and 1,3-propanediol is prepared as in Example 1 to an I.V. of 0.94.

The polymer is ground, dried, and spun as in Example 2 with the barrel at 280° C. and the capillary at 280°

C. Fiber is extruded at 0.2 cm./min. and wound at 3400 ft./min. to give 6.2 denier as-spun fibers with 3.8 g./den. tenacity.

15. U.S. Pat. No. 3,496,839 gives examples of the preparation of polyesters of trans-4,4'-stilbenedicarboxylic, terephthalic acid, and neopentyl glycol. For comparison of our polymers with those in U.S. Pat. No. 3,496,839, we prepared a polymer containing 60 mol % trans-4,4'-stilbenedicarboxylic acid, 40 mol % terephthalic acid, and 100 mol % neopentyl glycol.

A mixture of 142.1 g. (0.48 mol) dimethyl trans-4,4'-stilbenedicarboxylate, 62.1 g. (0.32 mol) dimethyl terephthalate, 166.4 g. (1.6 mols) neopentyl glycol, and 0.15 g. titanium tetraisopropoxide (100 ppm Ti) is placed in a one-liter flask equipped as in Example 1. The flask is heated at 200° C. for 1 hour, at 240° C. for ½ hour, and at 260° C. for ½ hour. A vacuum of 0.5 mm. is applied gradually and the temperature is raised to 280° C. After about 35 to 40 minutes at 280° C., a clear, yellow, high melt viscosity polymer is obtained with an I.V. of 0.89.

The polymer is ground, dried, and molded as described in Example 1 to give molded bars with 7,400 psi tensile strength.

16. A polymer of 100 mol % trans-4,4'-stilbenedicarboxylic acid and 100 mol % 1,5-pentanediol as disclosed in Example 5 of U.S. Pat. No. 2,657,195 is prepared using a procedure similar to our Example 1. A clear, light yellow polymer turns opaque on cooling and has an I.V. of 1.1.

The polymer is ground, dried, and injection molded at 290° C. to give molded bars with 12,200 psi tensile strength.

17. A polymer having the same composition as Example 16 is prepared to an I.V. of 0.71, and spun at 265° C. as in Example 1. Fiber is extruded at 0.6 cm./min. and wound at 2000 ft./min. to give 6.9 denier as-spun fibers with 1.0 g./den. tenacity.

18. A polymer of 100 mol % trans-4,4'-stilbenedicarboxylic acid and 100 mol % 1,6-hexanediol disclosed in Japanese Kokai No. 72348/74 as a polymer blend with poly(1,4-butylene terephthalate) is prepared as in Example 1. The opaque fibrous polymer has an I.V. of 0.85.

The polymer is ground and molded at 260° C. Molded bars have 18,000 psi tensile strength.

The polymer is spun as in Example 2 with the barrel and the capillary at 265° C. Fiber is extruded at 0.2 cm./min. and wound at 1100 ft./min. to give 4.0 denier as-spun fiber with 4.0 g./den. tenacity.

19. U.S. Pat. No. 3,496,839 discloses polymers of trans-4,4'-stilbenedicarboxylic acid and 1,4-cyclohexanedimethanol (Column 2, line 29). For comparison with the polymers of our invention, we prepared a polymer containing 60 mol % trans-4,4'-stilbenedicarboxylic acid, 40 mol % terephthalic acid, and 100 mol % 1,4-cyclohexanedimethanol.

A mixture of 133.2 g. (0.45 mol) dimethyl trans-4,4'-stilbenedicarboxylate, 58.2 g. (0.30 mol) dimethyl terephthalate, 185.1 g. (0.90 mol) 1,4-cyclohexanedimethanol (70% trans), and 0.15 g. titanium tetraisopropoxide (100 ppm Ti) is placed in a liter flask equipped as in Example 1. The flask is heated at 200° C. and the temperature is raised immediately to 300°–310° C. over the next hour. After ~30 minutes at 300°–310° C. a vacuum of 0.5 mm. is gradually applied. The vacuum is maintained for 15 minutes. A slightly hazy, high melt viscosity, light yellow polymer is obtained with an I.V. of 0.82.

The polymer is ground, dried, and then molded at 290° C. as described in Example 1 to give molded bars with 10,400 psi tensile strength.

20. A polymer containing 80 mol % 2,6-naphthalenedicarboxylic acid, 20 mol % trans-4,4'-stilbenedicarboxylic acid, and 100 mol % 1,4-butanediol is prepared according to the procedures of Example 1. The final polycondensation is carried out at 260° C. to give a crystalline polymer with an I.V. of 1.0.

The polymer is ground, dried, and injection molded at 260° C. to give molded bars with 29,200 psi tensile strength.

TABLE 1

COMPARISON OF TRANS-4,4'-STILBENEDICARBOXYLIC ACID/2,6-NAPHTHALENEDICARBOXYLIC ACID OR TEREPHTHALIC ACID/GLYCOL COPOLYESTER TENSILE STRENGTHS

| SDA,[a] Mol % | TPA,[a] Mol % | NDA[a] Mol % | Glycol | I.V.[b] | Tensile Strength psi | Example No. |
|---|---|---|---|---|---|---|
| 0 | 0 | 100 | 1,4-butanediol | 0.88 | 13,900 | 11 |
| 20 | 0 | 80 | 1,4-butanediol | 1.00 | 29,200 | 20 |
| 30 | 0 | 70 | 1,4-butanediol | 0.96 | 37,800 | 1 |
| 50 | 0 | 50 | 1,4-butanediol | 1.03 | 33,100 | 4 |
| 50 | 50 | 0 | 1,4-butanediol | 0.92 | 37,100 | 6 |
| 80 | 0 | 20 | 1,4-butanediol | 1.00 | 38,200 | 7 |
| Miscellaneous Examples of Other Glycols | | | | | | |
| 100 | 0 | 0 | 1,3-propanediol | ** | | |
| 90 | 10 | 0 | 1,3-propanediol | 0.81 | 6,000 | 12 |
| 80 | 20 | 0 | 1,3-propanediol | 0.91 | 12,100 | 13 |
| 60 | 40 | 0 | 2,2-dimethyl-1,3-propanediol | 0.89 | 7,400 | 15 |
| 100 | 0 | 0 | 1,5-pentanediol | 1.10 | 12,200 | 16 |
| 100 | 0 | 0 | 1,6-hexanediol | 0.85 | 18,000 | 18 |
| 60 | 40 | 0 | 1,4-cyclohexanedimethanol | 0.82 | 10,400 | 19 |

[a]SDA is trans-4,4'-stilbenedicarboxylic acid, TPA is terephthalic acid, NDA is 2,6-naphthalenedicarboxylic acid.
[b]Inherent viscosity is determined in 60/40 phenol/tetrachloroethane (wt/wt).
**Too high melting to spin or mold.

TABLE 2

COMPARISON OF TRANS-4,4'-STILBENEDICARBOXYLIC ACID/2,6-NAPHTHALENEDICARBOXYLIC ACID OR TEREPHTHALIC ACID/GLYCOL COPOLYESTER AS-SPUN FIBER TENACITIES

| SDA,[a] Mol % | TPA,[a] Mol % | NDA[a] Mol % | Glycol | I.V.[b] | Tenacity g/den. | Example No. |
|---|---|---|---|---|---|---|
| 0 | 0 | 100 | 1,4-butanediol | 1.19 | 4.5 | 10 |
| 20 | 0 | 80 | 1,4-butanediol | 1.00 | 10.4 | 9 |
| 30 | 0 | 70 | 1,4-butanediol | 0.79 | 7.2 | 2 |
| 30 | 0 | 70 | 1,4-butanediol | 1.42 | 9.3 | 3 |
| 50 | 0 | 50 | 1,4-butanediol | 0.98 | 8.3 | 5 |
| 80 | 0 | 20 | 1,4-butanediol | 1.07 | 8.4 | 8 |
| Miscellaneous Examples of Other Glycols | | | | | | |
| 40 | 60 | 0 | 1,3-propanediol | 0.94 | 3.8 | 14 |
| 100 | 0 | 0 | 1,5-pentanediol | 0.71 | 1.0 | 17 |
| 100 | 0 | 0 | 1,6-hexanediol | 0.85 | 4.0 | 18 |

[a]See footnote a, Table 1
[b]See footnote b, Table 1

The invention has been described in detail with particular reference to preferred embodiments thereof, but it will be understood that variations and modifications can be effected within the spirit and scope of the invention.

We claim:

1. A copolyester comprising repeating units prepared from about 80 to about 20 mol % trans-4,4'-stilbenedicarboxylic acid or esters thereof, and repeating units prepared from about 80 to about 20 mol % terephthalic acid, or about 80 to about 20 mol % 2,6-naphthalenedicarboxylic acid or esters thereof and repeating units prepared from 1,4-butanediol, said copolyester having an inherent viscosity of about 0.3 or more determined at 25° C. in 60/40 (wt./wt.) phenol/tetrachloroethane (PTCE) at a concentration of 0.5 g./100 mL and said copolyester when injection molded into 1/16 inch tensile bars exhibits a tensile strength of at least 20,000 psi.

2. Copolyester of claim 1 wherein the repeating units from the terephthalic acid portion of the polyester are present in the amount of 70 to 20 mol % and the repeating units from the 2,6-naphthlenedicarboxylic acid portion of the polyester are present in the amount of 80 to 20 mol %.

3. Copolyester of claim 1 wherein up to about 10 mol % of the repeating units of terephthalic acid or 2,6-naphthlenedicarboxylic acid are replaced with repeating units from isophthalic acid.

4. Copolyester of claim 1 wherein the terephthalic acid repeating units are from substituted terephthalic acid repeating units selected from 2-chloro, 2,5-dichloro, 2-methyl, 2-ethyl, 2-propyl, or 2,5-dimethyl terephthalic acid or esters thereof.

5. Copolyesters of claim 1 wherein repeating units from said 1,4-butanediol are replaced with up to about 10 mol % of repeating units from another glycol having 2 to 8 carbon atoms.

* * * * *